April 14, 1925.　　　　　　　　　　　　　　　　　　　　1,533,437
A. J. MACY
EDUCATIONAL DEVICE
Original Filed April 11, 1921
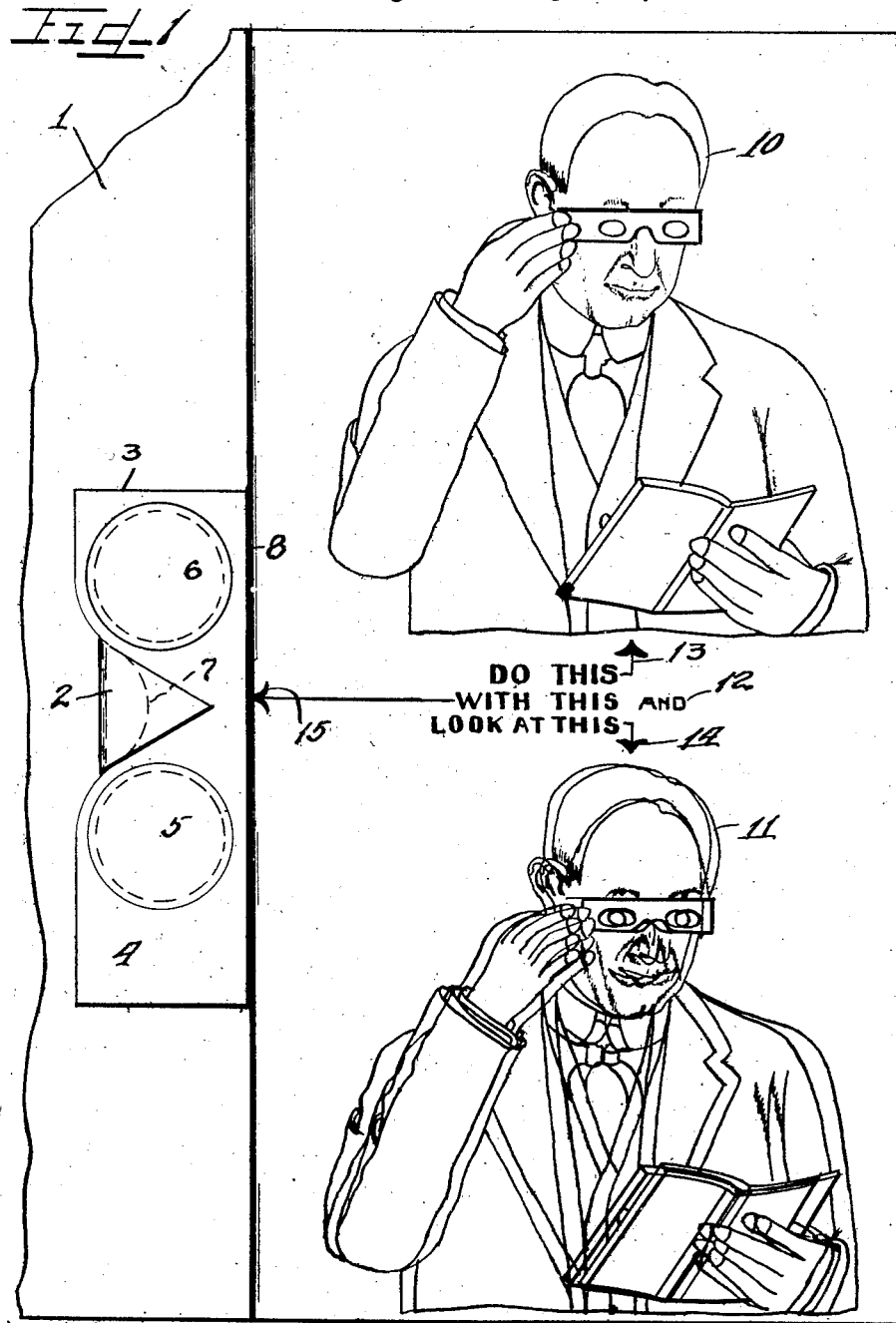

Patented Apr. 14, 1925.

1,533,437

UNITED STATES PATENT OFFICE.

ALFRED J. MACY, OF CHICAGO, ILLINOIS, ASSIGNOR TO MACY ART PROCESS CORPORATION, A CORPORATION OF ILLINOIS.

EDUCATIONAL DEVICE.

Application filed April 11, 1921, Serial No. 460,431. Renewed August 25, 1924.

*To all whom it may concern:*

Be it known that I, ALFRED J. MACY, a citizen of the United States, and a resident of the city of Chicago, in the county of Cook and State of Illinois, have invented certain new and useful Improvements in an Educational Device; and I do hereby declare that the following is a full, clear, and exact description of the same, reference being had to the accompanying drawings, and to the numerals of reference marked thereon, which form a part of this specification.

This invention has to do with a device for teaching the use of an instrument for viewing specially colored pictures.

It is an object of this invention to so prepare the directions for the use of this instrument that a person may see at a glance what is the intended use.

It is a further object of this invention to incorporate the directions for use of this instrument on the first page of a book containing pictures to be viewed through the instrument.

It is a further object of this invention to secure an instrument of the sort required on the cover of said book adjacent to the directions mentioned.

It is a further object of this invention to so prepare the directions that they will appeal to persons and cause them to wish to use the instrument to view the pictures in the book.

Other and further important objects of the invention will be apparent from the disclosures in the drawings and the specification.

The invention (in a preferred form) is illustrated in the drawings and hereinafter more fully described.

The one figure in the drawing is a view of the inside of the cover and of the first page of a book illustrating my invention.

The cover 1 is provided with a flap 2 beneath which the instrument 3 is mounted. This instrument consists of a card 4 having two transparent portions 5 and 6 consisting of colored gelatine. These portions are at the proper distance to fit over a person's eyes and between them the edge of the card is cut away to form a notch 7 which will fit over a person's nose and properly position the colored spaces before a person's eyes.

The card is placed under the flap with the notch 7 against the flap 2 so that the narrow portion of the card comes between the flap and the binding edge 8 of the cover. The first page 9 of the book has at the upper half of the page a picture 10 showing a person using the card to look at pictures in a book. Below at 11 is a picture of the same person in the same position. The latter picture however is printed in two overlapping colors so that when it is viewed through the colored gelatine upon the card it will have a stereoscopic effect.

Between the pictures is a legend 12 reading "Do this with this and look at this." From three appropriate points in the legend go three arrows, 13, 14 and 15, leading respectively to the two pictures and to the card so that the effect of the legend is to direct a person to do what the picture in the upper half of the page indicates, using the instrument upon the inside of the cover of the book and looking at the picture on the lower half of the page.

The remainder of the book contains other pictures printed in colors like the picture 11. It is obvious that the beholder of the book, upon seeing on the first page the sample picture and directions, will naturally look at the pictures in the remainder of the book in the same way. The device therefore at once and effectively teaches how the optical instrument is to be used.

The book is available for giving stereoscopic views of merchandise which is catalogued therein, or of articles about which the book is instructive, or for any other purpose for which stereoscopic views are useful.

It is intended that the book should be distributed with the card 3 in place in the cover. The card 3 is inexpensive to manufacture and may be distributed with no greater expense than the books themselves. The device is therefore well adapted for both advertising and instruction and may be used for either purpose.

I am aware that various details of construction may be varied through a wide range without departing from the principles of this invention, and I therefore do not purpose limiting the patent granted otherwise than necessitated by the prior art.

I claim as my invention:

1. In combination, a leaf of a publication, an optical instrument, means for supporting it adjacent the edge of the leaf, a picture on the leaf illustrating the use of said instrument, a picture on said leaf to be viewed through said instrument, and a legend located between said pictures, opposite said instrument, giving directions to use the instrument in the manner indicated by the one picture to view the other.

2. In combination, a leaf of a publication, an optical instrument, means for supporting it adjacent the edge of the leaf, a picture on the leaf illustrating the use of said instrument, a picture on said leaf to be viewed through said instrument, a legend located between said pictures, opposite said instrument, giving directions to use the instrument in the manner indicated by the one picture to view the other, and index marks leading respectively from appropriate words in said legend to each of said pictures and to said instrument.

3. A card, colored transparent eye places in said card, a notch for the nose in one edge of the card between the eye places, in combination with a book cover having a flap on the inner side thereof so located that there is only room between the back of said flap and the binding edge of said cover for the narrow part of said card produced by said notch, in combination with a book having pictures colored to co-operate with said card to produce stereoscopic effects and having on its first page directions to view said pictures through said card, said directions including a picture illustrating the manner of use of said card.

4. A card, colored transparent eye places in said card, a notch for the nose in one edge of the card between the eye places, in combination with a book cover having a flap on the inner side thereof so located that there is only room between the back of said flap and the binding edge of said cover for the narrow part of said card produced by said notch, in combination with a book having pictures colored to co-operate with said card to produce stereoscopic effects and having on its first page directions to view said pictures through said card, said directions including a picture illustrating the manner of use of said card, and one of said first mentioned pictures being a reproduction of said illustration.

5. In combination, a leaf of a publication, an optical instrument, means for supporting it adjacent the edge of the leaf, a picture on the leaf illustrating the use of said instrument, a picture on said leaf to be viewed through said instrument, and a legend located between said pictures, opposite said instrument, giving directions to use the instrument in the manner indicated by the one picture to view the other, the second-named picture being adapted to cooperate with said instrument to produce a stereoscopic effect and representing the same illustration as the first-named picture.

In testimony whereof I have hereunto subscribed my name in the presence of two subscribing witnesses.

ALFRED J. MACY

Witnesses:
　CARLTON HILL,
　JAMES M. O'BRIEN.